United States Patent [19]

Shin et al.

[11] Patent Number: 5,754,670
[45] Date of Patent: May 19, 1998

[54] DATA SYMBOL READING SYSTEM

[75] Inventors: Takeharu Shin; Shuzo Seo; Nobuhiro Tani; Makoto Nukui; Yukihiro Ishizuka, all of Tokyo, Japan

[73] Assignee: Asahi Kogaku Kogyo Kabushiki Kaisha, Tokyo, Japan

[21] Appl. No.: 666,863

[22] Filed: Jun. 19, 1996

[30] Foreign Application Priority Data

Jun. 21, 1995 [JP] Japan ................................. 7-179533

[51] Int. Cl.⁶ ...................................................... G06K 9/36
[52] U.S. Cl. .............................. 382/56; 235/462; 235/455
[58] Field of Search .............................. 235/462, 470, 235/474, 476, 455; 382/56

[56] References Cited

U.S. PATENT DOCUMENTS 4,782,455  11/1988  Morinouchi et al. .
4,949,391  8/1990  Faulkerson et al. .
5,473,148  12/1995  Tanaka et al. ............................ 235/462
5,478,997  12/1995  Bridgelall et al. ...................... 235/462

FOREIGN PATENT DOCUMENTS

1279474  6/1972  United Kingdom .
2205672  12/1988  United Kingdom .

Primary Examiner—Harold Pitts
Attorney, Agent, or Firm—Greenblum & Bernstein, P.L.C.

[57] ABSTRACT

A stationary data symbol reader includes a CCD, lens, CCD drive circuit, amplification circuit, binarization circuit, memory, CPU, light sources, light source drive circuit, communication driver, switch circuit and trigger switch. When reading, a frame image capture is carried out, and a number of picture elements of the fields of the frame corresponding to the displacement of an authenticator pattern (associated with the data symbol) between a second field image and a first field image is calculated. The moving speed of the data symbol is calculated from the displacement. The optimal light exposure time is calculated from the moving speed, and the optimal intensity of illumination is calculated from the exposure time.

17 Claims, 8 Drawing Sheets

DATA SYMBOL READING SYSTEM

BACKGROUND OF THE INVENTION

The present invention relates to a data symbol reader for reading information encoded in a data symbol, for example, a two-dimensional tessellated data symbol.

Bar codes and associated devices for reading bar code information are widely used for applications such as point-of-sale (POS) systems. However, most common bar codes and readers use the familiar one-dimensional format, in which information is encoded one-dimensionally in an arrangement of parallel bars. A one-dimensional formal data symbol can hold only a small amount of information.

Two dimensional symbols using a binary-encoded mosaic (or "tessellated") rectangular pattern, typically a black and white pattern, hold more information. Data symbol readers for reading the tessellated symbols use either an area image sensor or a line image sensor. With a line sensor, the reading device and data symbol are moved relative to each other for auxiliary scanning, and the line sensor repetitively main scans lines of the data symbol to compose an area image. With an area sensor (usually an area CCD) an image of the data symbol pattern is captured in two dimensions simultaneously. Reading devices which use an image sensing device (i.e., an area image sensor) do not require relative movement between the reading unit and the data symbol for sub-scanning, and are thus able to read data symbols in a shorter time.

A stationary data symbol reader may be used for reading a moving data symbol. One example of an appropriate application is reading data symbols borne by products moving along an inspection or conveying line in a factory, either automatically or by hand.

When the data symbol reader is stationary, but the symbol itself moves, the moving speed of the symbol varies. If automatic, the speed will vary between conveying devices. If an operator manually moves the item bearing the symbol past the symbol reader, the speed will constantly vary. The conventional symbol reader cannot obtain the moving speed of a data symbol to be read.

In a case where a moving data symbol is read by a conventional data symbol reader having an image sensing device, it is very difficult to accurately set an exposure (exposure time, light amount) suiting the moving speed of the data symbol. If the exposure time is too long, the image blurs and becomes unreadable. If the exposure time is too short, sufficient imaging information is not extracted (for example, insufficient levels of contrast for thresholding), leading to reading errors.

SUMMARY OF THE INVENTION

It is therefore an object of the present invention to provide an improved data symbol reading system capable of reliably reading data symbols moving at different speeds.

The present invention is directed to a data symbol reading system that satisfies this object. According to one aspect of the present invention, a data symbol reading system includes: a reading unit including an image sensing device for capturing images and an optical system for forming images on the image sensing device; and speed detecting means for detecting a moving speed of the data symbol relative to the reading unit.

In this manner, the data symbol reading system is capable of detecting the moving speed of a data symbol reader by the reading unit.

In one particular embodiment of the invention, the speed detecting means includes a controller for controlling the image sensing device to carry out two successive image captures with a predetermined time interval therebetween. A memory stores data corresponding to the two successive image captures. Calculation means calculates a displacement between the two successive image captures, and further calculates a moving speed of the data symbol based on the displacement and the predetermined time interval.

Accordingly, using the image sensing device itself, successive images are compared, and the relative displacement of the images is converted into a moving speed of the data symbol using a predetermined time interval between successive images. No additional sensors or displacement meters are necessary.

In this embodiment, the data symbol is preferably provided with an authenticator pattern that moves together with the data symbol. The controller controls the image sensing device to capture to successive images, each successive image capture including an image of the authenticator pattern. The calculation means calculates a displacement of the image of the authenticator pattern between the two successive image captures, and calculates the moving speed of the data symbol based on the displacement of the image of the authenticator pattern and the predetermined time interval.

Accordingly, the authenticator pattern provides an indicator to the calculation means that the image displacement between images having the authenticator pattern therein should be calculated. Furthermore, since the authenticator pattern is provided separately from the data symbol itself, the authenticator pattern can be a very simple pattern, easily recognizable by the calculation means.

In an alternative embodiment, the image sensing device captures video frame images, each video frame image having an odd line video field and an even line video field with a predetermined time interval therebetween. The speed detecting means includes a controller for controlling the image sensing device to carry out a video frame image capture. A memory stores data corresponding to the odd line video field and the even line video field. Calculation means calculates a displacement between the odd line video field and the even line video field, and calculates the moving speed of the data symbol based on the displacement and the predetermined time interval.

In this case, the two fields of a video frame, having a known time interval therebetween, are used for calculating the displacement of the data symbol during the known time interval. The authenticator pattern as above can also be used with this embodiment.

Preferably, this aspect of the invention includes ensure time setting means for setting an exposure time of the image sensing device based on the calculated moving speed. Thus, the appropriate exposure time can be set according to the moving speed of the data symbol, preventing blurring of the symbol image or underexposure thereof.

In this case, the data symbol reading system may further include a variable intensity light source, and light intensity setting means for setting the light emitting intensity of the light source based on the exposure time. Accordingly, not only can the exposure time be set to accurately capture the data symbol, but if the required exposure time is too short for the existing light amount, the variable intensity light source can be adjusted according to the exposure time to provide a correct exposure, i.e., shutter-priority exposure control is implemented.

According to another aspect of the present invention, a data symbol reading system, includes: a data symbol reader including an image sensing device for capturing images, an optical system for forming images of a symbol reading area on the image sensing device, and speed detecting means for detecting a moving speed of the data symbol relative to the reading unit. A moving subject bearing a data symbol is movable such that the data symbol moves through the symbol reading area.

Preferably, an authenticator pattern is provided on the moving subject. Further preferably, the authenticator pattern is provided on the moving subject ahead of the data symbol in a moving direction of the moving subject.

Accordingly, the authenticator pattern provides an indication to the speed detection means that the speed of the moving subject, and therefore of the data symbol, should be detected. Furthermore, since the authenticator pattern is provided separately from the data symbol itself, the authenticator pattern can be a very simple pattern, easily recognizable by the speed detecting means.

According to a preferred arrangement, the speed detecting means includes a controller for controlling the image sensing device to capture two successive images of the symbol reading area separated by a predetermined time interval, each successive image including an image of the authenticator pattern. A memory stores data representative of the two successive images. Calculation means calculates a displacement between the images of the authenticator pattern between the two successive images, and calculates the moving speed based on the displacement the predetermined time interval.

In one development of this aspect of the invention, the data symbol reading system includes synchronization means for synchronizing movement of the moving subject with the image capture by the image sensing device. In this manner, the reading unit can recognize when the data symbol image should be captured. In this case, the synchronization means may include a trigger switch connected to the reading unit, positioned in the path of the moving subject, and actuatable by the moving subject; and a timer for counting a predetermined delay after an actuation of the trigger switch by the moving subject, the reading device responding to the timer by starting the image capture.

In still another aspect of the present invention, a data symbol reading system includes: a reading unit including an image sensing device for capturing images and an optical system for forming images on the image sensing device. The image sensing device captures video frame images, each video frame image having an odd line video field and an even line video field with a predetermined time interval therebetween. A controller controls the image sensing device to carry out the video frame image capture, while a memory stores data corresponding to the odd line video field and the even line video field. Calculation means calculates a displacement between the odd line video field and the even line video field, and calculates the moving speed of the data symbol based on the displacement and the predetermined time interval.

According to yet another aspect of the present invention, a data symbol reading system includes: a reading unit including an image sensing device for capturing images and an optical system for forming images on the image sensing device; speed detecting means for detecting a moving speed of the data symbol relative to the reading unit; and exposure time setting means for setting an exposure time of the image sensing device based on the calculated moving speed. In this case, the data symbol reading system preferably further includes a variable intensity light source, and light intensity setting means for setting the light emitting intensity of the light source based on the exposure time.

According to yet still another aspect of the present invention, a data symbol reading system includes: a reading unit including an image sensing device for capturing images and an optical system for forming images on the image sensing device. A controller controls the image sensing device to capture two successive images with a predetermined time interval therebetween. The data symbol is provided with an authenticator pattern that moves together with the data symbol, and each successive image capture includes an image of the authenticator pattern. A memory stores data corresponding to the two successive image captures. Calculation means calculates a displacement of the image of the authenticator pattern between the two successive image captures, and calculates the moving speed of the data symbol based on the displacement of the image of the authenticator pattern and the predetermined time interval.

DETAILED DESCRIPTION OF THE PREFERRED EMBODIMENTS

Figure 1:
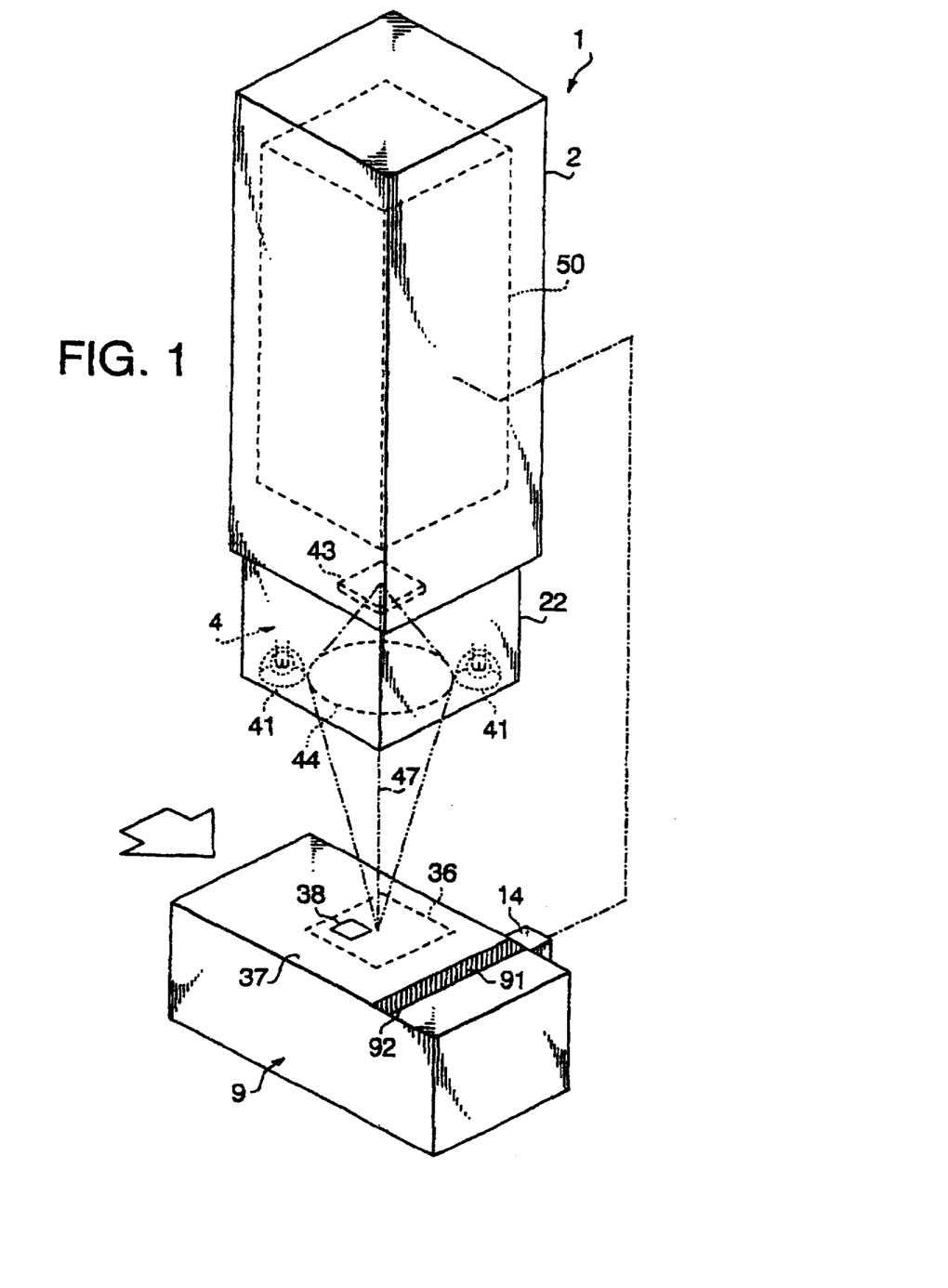
FIG. 1 is a perspective view of a preferred embodiment of the data symbol reading system according to the invention.
Figure 2:
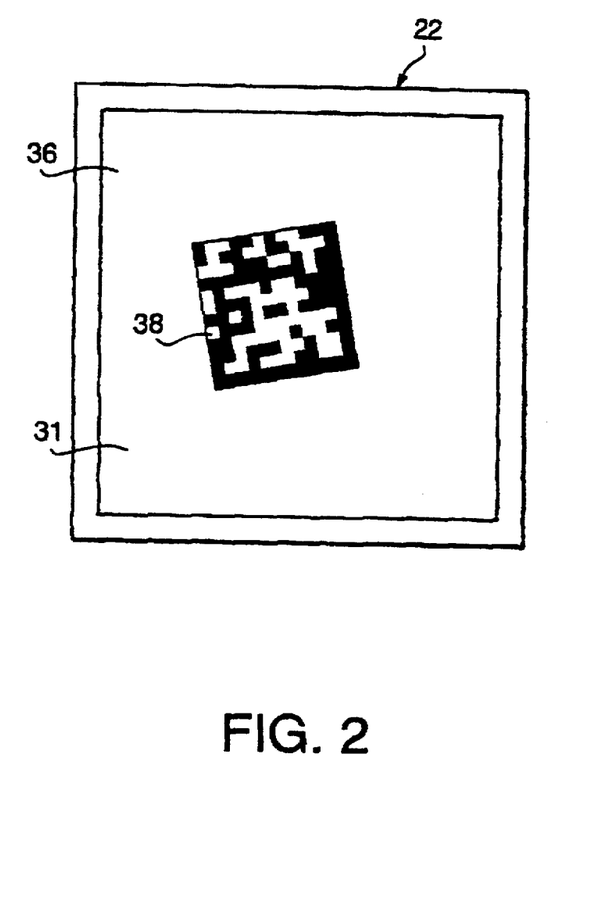
FIG. 2 is a bottom plan view of the data symbol reading system shown in FIG. 1.
Figure 3:
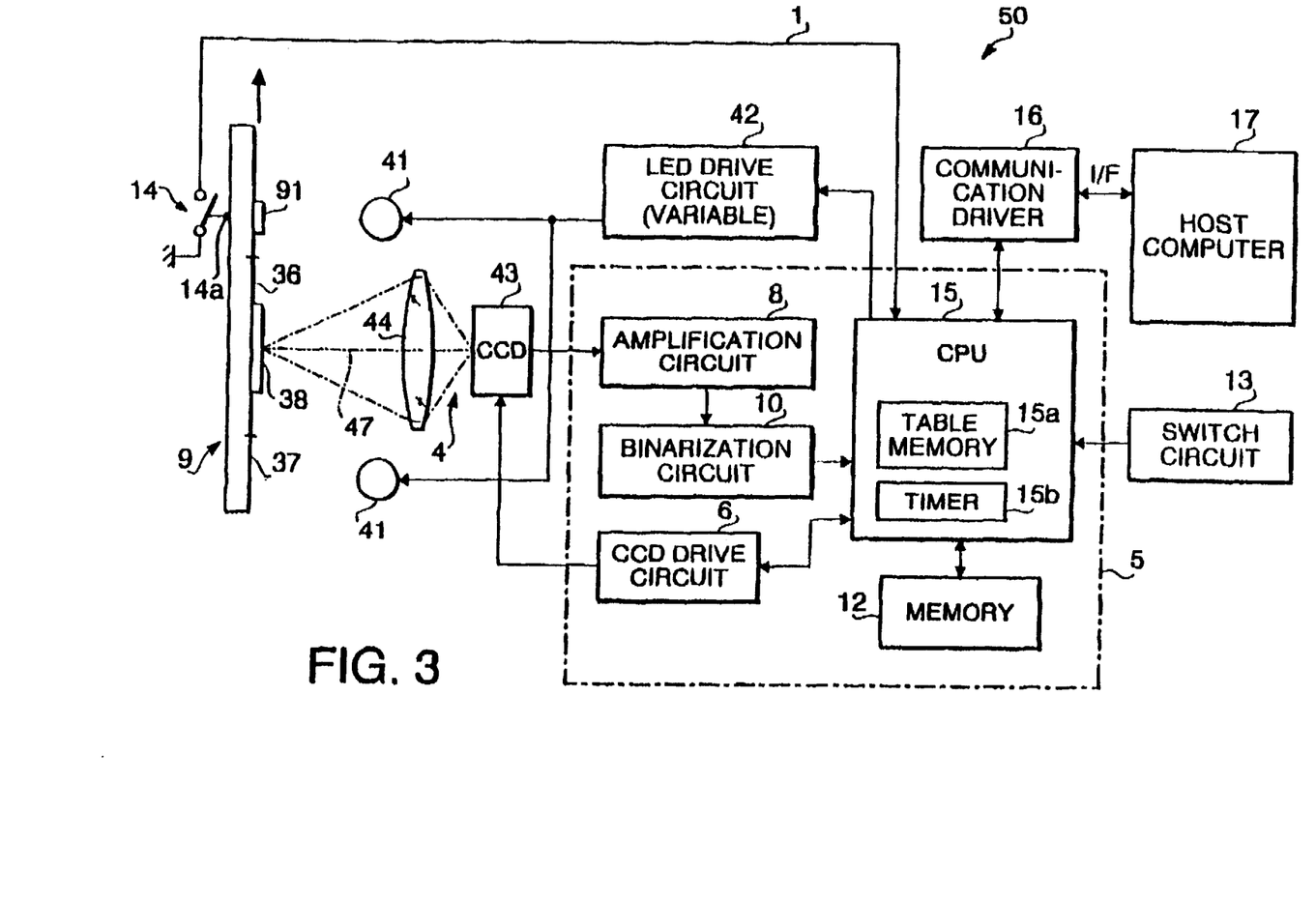
FIG. 3 is a block diagram showing a circuit configuration of the data symbol reading system shown in FIG. 1.

FIG. 1 is a perspective view of a preferred embodiment of a data symbol reading system according to the invention, FIG. 2 is a bottom plan view of the data symbol reader of FIG. 1, and FIG. 3 is a block diagram showing a circuit configuration of the data symbol reader illustrated in FIG. 1.

With reference to FIGS. 1 through 3, the data symbol reading system according to the invention includes a data symbol reader 1 and a moving subject 9. The data symbol reader 1 of the invention is stationary, i.e., mounted on a stand or positioning arm. The data symbol reader 1 includes a casing 2 having a head portion 22 at the reading end thereof. A rectangular reading end opening 31 (shown in FIG. 2) is formed at the reading end of the head portion 22.

The casing 2 houses a reading unit 4, and a control circuit 50. As shown in FIG. 3, the control circuit 50 includes a signal processing circuit 5, a light source driving circuit 42, and a communication driver 16.

The reading unit 4 includes two light sources 41, 41; an area charge coupled device (CCD) 43 as an image sensing device; and an optical system 44. The optical system 44 guides light from a symbol reading area 36 to form an image on the light receiving surface of the CCD 43. The symbol reading area 36 is defined by the reading unit 4, and a data symbol 38 borne by a moving subject 9 passes through the symbol reading area 36.

The two light sources 41 illuminate the symbol reading area 36, and are set in a substantially symmetrical manner with respect to the light path 47. A light emitting element such as an LED, a halogen lamp, a semiconductor laser, or a light valve is used as the light source 41. A diffuser plate (not shown) with a rough or translucent surface may be installed at the light emitting side of the light sources 41, in order to make the luminance at the symbol reading area 36 more uniform. The light sources 41 are controlled by the light source driving circuit 42 in the control circuit 50.

The CCD 43 has many photodiode light receiving (or "picture") elements disposed in an array. Each of the picture elements accumulates an electrical charge corresponding to the amount of light received, and transfers the charge in sequence at a predetermined time. The transferred charges are readable (analog) image signals. Furthermore the CCD has an electronic shutter function for controlling the time of electric charge accumulation.

The symbol reading area 36 is formed on a reference plane 37 on the moving subject 9, i.e., the surface upon which the data symbol 38 is positioned. The light reflected from the symbol reading area 36 is directed to the CCD 43 by the optical system 44. The symbol reading area 36 is aligned with the front opening 31 of the head part 22, and is included in the effective sensing area of the CCD 43.

As shown in FIG. 2, the data symbol 38 consists of a tessellated pattern of black and white cells (alternatively, black and transparent cells) arranged in an array. The array has no less than 2 columns (i.e., x columns, where x>1) and rows (i.e., y rows, where y>1) of cells. In this way, each cell can express 0 or 1 in a binary system, and information can be specified by a binary combination of cells. However, the data symbol 38 readable by the data symbol reader 1 is not restricted to the illustrated arrangement. The control circuit 50 of the data symbol reader 1 includes a signal processing circuit 5 for processing the image signals received from the reading unit 4. As shown in FIG. 3, the signal processing circuit 5 includes a CCD driving circuit 6, an amplification circuit 8, a binarization circuit 10, a memory 12, and a central processing unit (CPU) 15 as control means.

In operation, the light source driving circuit 42 activates the two light sources 41 to illuminate the symbol reading area 36. Reflected light from the symbol reading area 36 passes through the optical system 44, forming an image on the light receiving surface of the CCD 43. The CCD 43 then outputs image signals (analog signals) corresponding to the amount of light received, which are amplified and undergo A/D conversion at the amplification circuit 8, are binarized at the binarization circuit 10, are read by the CPU 15, and are stored in the memory 12. The light source drive circuit 42, under the control of the CPU 15, supplies a variable amount of power for a variable duration to the light sources 41, thereby turning the light sources 41 ON and OFF, and further controlling the light intensity generated. The length of exposure and intensity are thereby controlled by the CPU 15.

The CPU 15 is further connected to the light source driving circuit 42, the communication driver 16, and a switch circuit 13 (for a trigger switch 14). In addition, the CPU has a table memory 15a for storing exposure tables for intensity and duration of exposure, and a timer 15b for timing the exposure. Optionally, an LED, LCD, or CRT display (not shown) is connected to the CPU 15.

The trigger switch 14 has an actuating lever 14a (shown in FIGS. 5A through 5D) and is turned ON when the actuating lever 14a is pressed. The trigger switch 14 is positioned such that the actuating lever 14a is pressed by the side edge portion of the moving subject 9 when the moving subject 9 reaches a predetermined position at which the capture of preparatory field images for speed detection is started.

This preparatory image capture position is a position of the moving subject 9 when an authenticator pattern 91 on the moving subject 9 reaches the symbol reading area 36 (in this embodiment, when the authenticator pattern 91 is in the vicinity of the center of the symbol reading area 36). The trigger switch 14 thus constitutes synchronization means for synchronizing the movement of the moving subject 9 with the image capture timing by the CCD 43.

The data symbol reader 1 is positioned such that the light received from the symbol reading area 36 is formed as an image on the CCD 43 by the optical system 44 and so that the reading end opening 31 is parallel to the reference plane 37.

Furthermore, as shown in FIG. 1, a conveyor (not shown) which transfers the moving subject 9 bearing the data symbol 38 is positioned opposite the data symbol reader 1 in FIG. 1. The conveyor transfers the moving subject 9 parallel to the plane within which the picture elements of the CCD 43 are arrayed, and through the symbol reading area 36 opposite head portion 22.

In this embodiment, the authenticator pattern 91 is a band-like pattern on the moving subject 9 extending perpendicular to the moving direction, provided in front of the data symbol 38 in the moving direction (downstream) thereof. The authenticator pattern 91 is separated from the data symbol 38 by a predetermined distance.

Speed Detection

When the trigger switch 14 of the data symbol reader 1 is turned ON by a passing moving subject 9, a process to carry out preparatory field image captures (i.e., light exposure and image capture) to detect the moving speed of the data symbol 38 is begun, and the exposure is subsequently determined.

The preparatory field image capture is carried out twice at a predetermined interval in order to detect the change in position of the authenticator pattern 91, as reference for detecting the moving speed of the data symbol 38.

Figure 4:
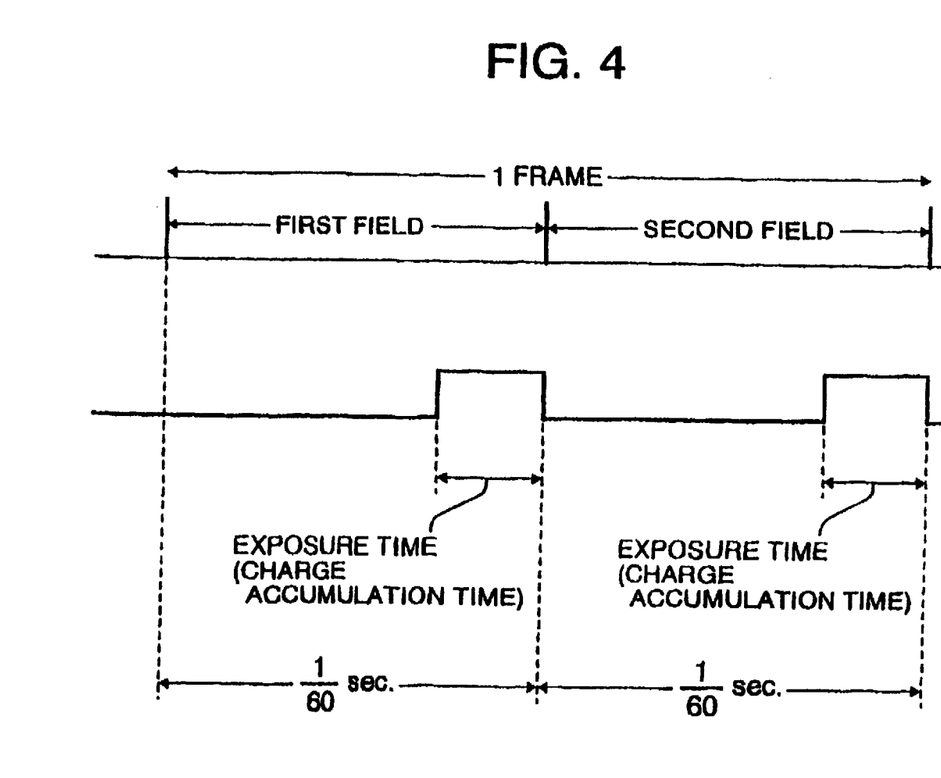
FIG. 4 is a timing chart describing a frame image capture.

FIG. 4 is a timing chart showing timing for the CCD 43 to perform two field image captures. The fields are two video fields separated at 60 Hz of a 30 Hz video frame. i.e., the first field has only odd lines and the second has only even lines of the CCD 43. The light exposure time (electric charge accumulation time) is controlled by the electronic shutter function of the CCD 43. When performing an image capture, the second field image capture is performed 1/60 second after first field image capture.

For the preparatory first and second field image captures, the image capture is performed at the shortest light exposure time (i.e., the highest "shutter speed") and with the maximum light emitting intensity of the light sources 41. The image data (image signals) are binarized, and the binarized data (binarized signals) are written in the memory 12. The binarized data of the first field image are written in a first field image storing area of the memory 12, and the second field binarized data are written in a second field image storing area of the memory 12.

Figure 6A:
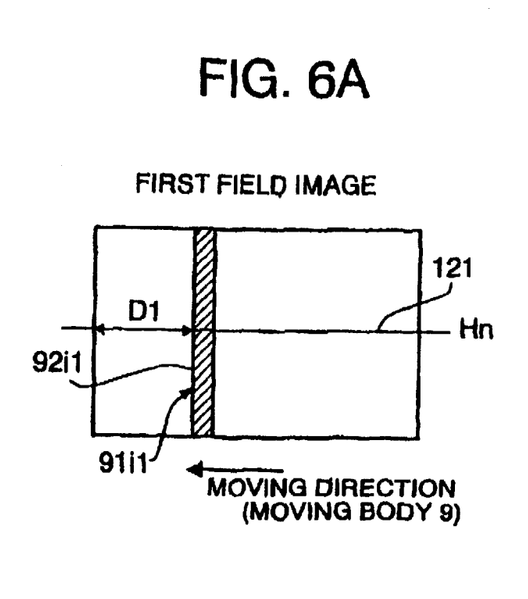
FIGS. 6A and 6B are explanatory diagrams showing an acquired first field image and an acquired second field image in a memory.

The displacement ΔD of the authenticator pattern is calculated as the displacement of a second authenticator pattern image $91_{i2}$ (shown in FIG. 6B) from a first authenticator pattern image $91_{i1}$ (shown in FIG. 6A). The moving speed V of the data symbol 38 is calculated on the basis of the displacement of the authenticator pattern 91 and the time difference (in this case, 1/60 second) between the first and second field image captures. The moving speed V is used to determine an appropriate exposure duration, an appropriate illumination intensity, and a waiting interval W until a data reading image capture is performed. The waiting interval W corresponds to a time from the end of the speed detecting process until the data symbol 38 reaches a predetermined position (for example, the center) within the symbol reading portion 36, and is easily determined from the moving speed V and a standard distance between the authenticator pattern 91 and the symbol 38.

FIGS. 5A through 5D are schematic plan views showing positions of the moving subject 9 as it moves through the symbol reading area 36. FIGS. 6A and 6B are explanatory views showing the first field image and second field image (the first acquired preparatory field image and the second acquired preparatory field image) as stored in the memory 12.

Figure 5A:
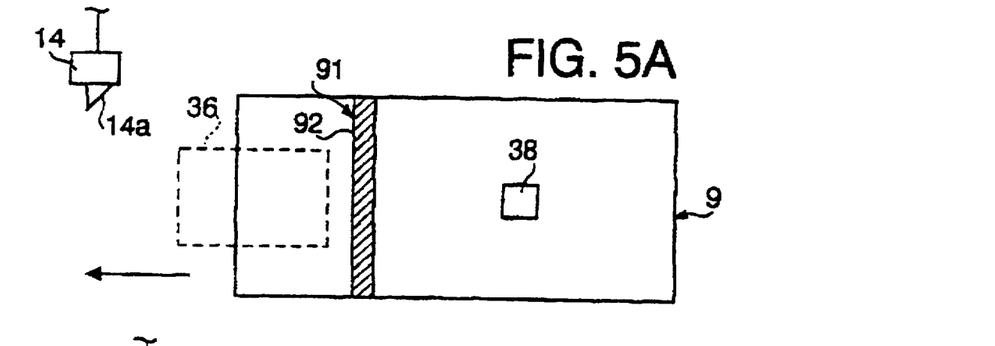
FIGS. 5A through 5D are schematic plan views showing a moving subject and a data symbol reading area.
Figure 6B:
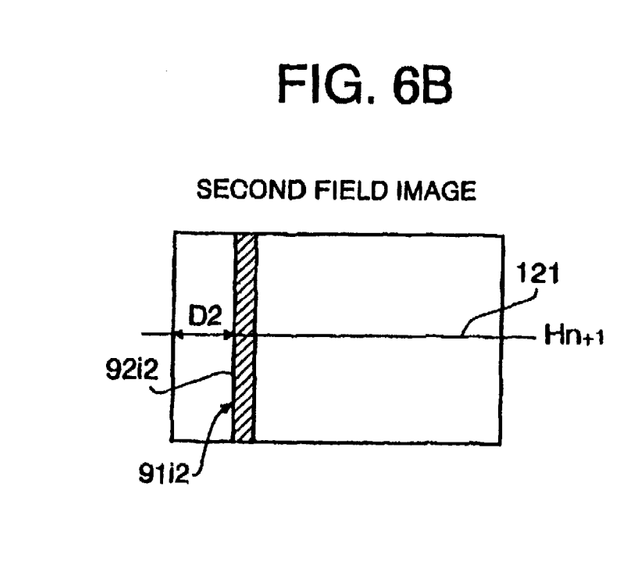

As shown in FIG. 5A, if the authenticator pattern 91 is not located in the data symbol reading area 36 when images are captured, binarized data having no authenticator pattern 91 is written in the memory 12. In the preferred embodiment, since the trigger switch 14 is turned OFF in the state shown in FIG. 5A, no image capture at all is carried out.

Figure 5B:
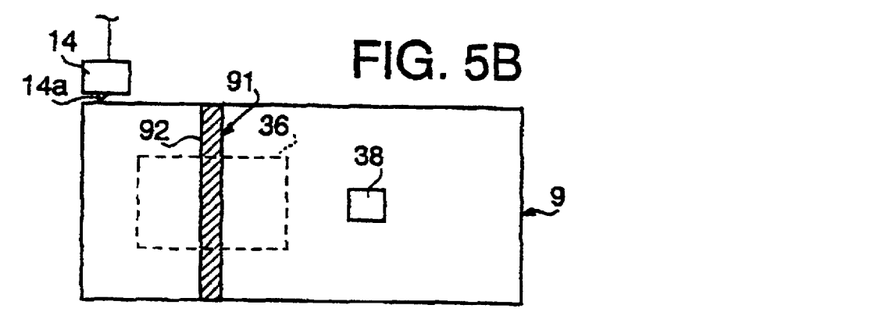
Figure 5C:
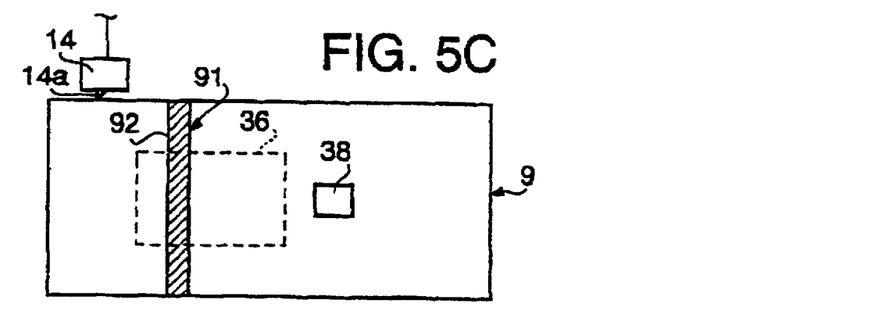

When the authenticator pattern 91 is positioned in the data symbol reading area 36 (as shown in FIGS. 5B and 5C), field images including the authenticator pattern 91 are written in the memory 12, as shown in FIGS. 6A and 6B. The first preparatory acquired field image shown in FIG. 6A corresponds to the image captured in FIG. 5B, and the second preparatory acquired field image shown in FIG. 6B corresponds to the image captured in FIG. 5C.

To find the displacement of the authenticator pattern 91, first the presence of an authenticator pattern 91 is checked in the first field. A predetermined nth (odd) horizontal line (line $H_n$ in FIG. 6A) of the first field image in the memory 12 is checked by the CPU 15, and if an identifiable authenticator pattern image $91_{i1}$ is found, the position is recorded. For example, the leading edge $92_{i1}$ and width of an authenticator pattern image $91_{i1}$ are searched for and identified, if present. Once the authenticator pattern image $91_{i1}$ is identified, a distance D1 from the leading edge $92_{i1}$ to the leading edge of the entire first field image is found. The distance D1 is preferably expressed as a number of picture elements.

If an authenticator pattern is found, the positions of the first and second preparatory field images are compared. That is, the position of the authenticator pattern 91 image is analyzed with respect to the image boundaries.

For the second field image, a predetermined (even) horizontal line (for example, line $H_{n+1}$ in FIG. 6B) of the second field image in the memory 12 is checked by the CPU 15, and the position is recorded. For example, the leading edge $92_{i2}$ and width of an authenticator pattern image $91_{i1}$ are searched for and identified. Once the authenticator pattern image $91_{i2}$ is identified, a distance D2 from the leading edge $92_{i2}$ to the leading edge of the entire second field image is found. The distance D2 is preferably expressed as a number of picture elements.

In order to calculate the speed of the moving subject 9 (and of the data symbol 38), firstly, the displacement of the second field image from the first field image, i.e., the difference $\Delta D$ between D1 and D2, is calculated. The moving speed V of the data symbol 38 relative to the reading portion is then calculated from an expression:

$$V = \frac{(\Delta D \times C_H)/M}{1/60} \quad (1)$$

In expression (1), $\Delta D$ is the difference between D1 and D2 expressed as a number of picture elements, $C_H$ is the length of one side of a picture element of the CCD 43, and M is the magnification of the optical system 44. Furthermore, as shown in FIG. 4, the denominator of expression (1) is the image capture time interval between the first and second preparatory field image captures (that is, 1/60 second).

Exposure Calculations

Figure 7:
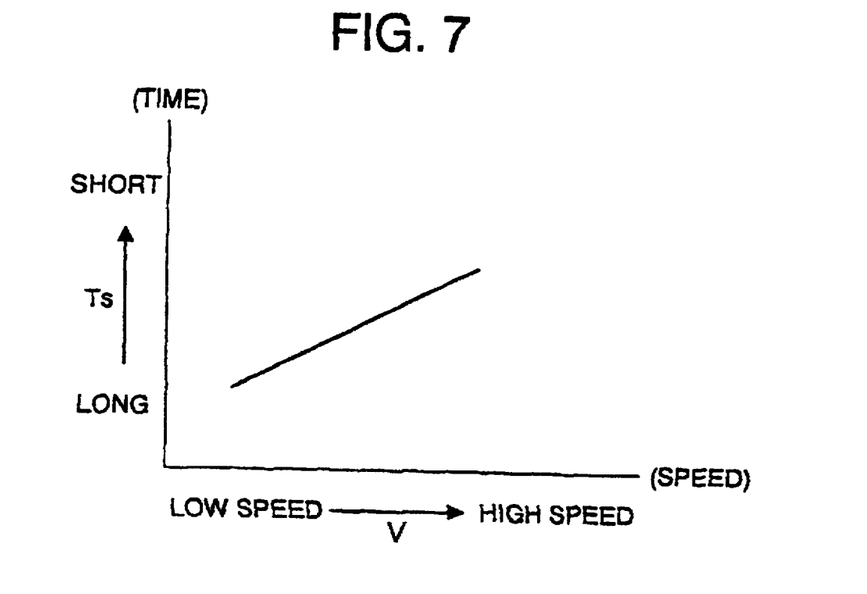
FIG. 7 is a graph showing a relationship between moving speeds of a symbol and exposure times.

The exposure tables stored in the CPU table memory 15a express relationships between moving speed V, exposure time, and illumination intensity. FIG. 7 is a graph showing an example relationship between the moving speed V and an optimum exposure time Ts, and FIG. 8 is a graph showing an example relationship between the optimum exposure time Ts and the optimum illumination (optimal light intensity) for the exposure time Ts.

As shown in FIG. 7, the optimum exposure time Ts (adequate electric charge accumulation time) can be calculated from the moving speed V. A plurality of appropriate combinations of the moving speeds V and optimum exposure times Ts is stored in the table memory 15a of the CPU 15. The optimum exposure time Ts is calculated by setting a Ts corresponding to the moving speed V.

Figure 8:
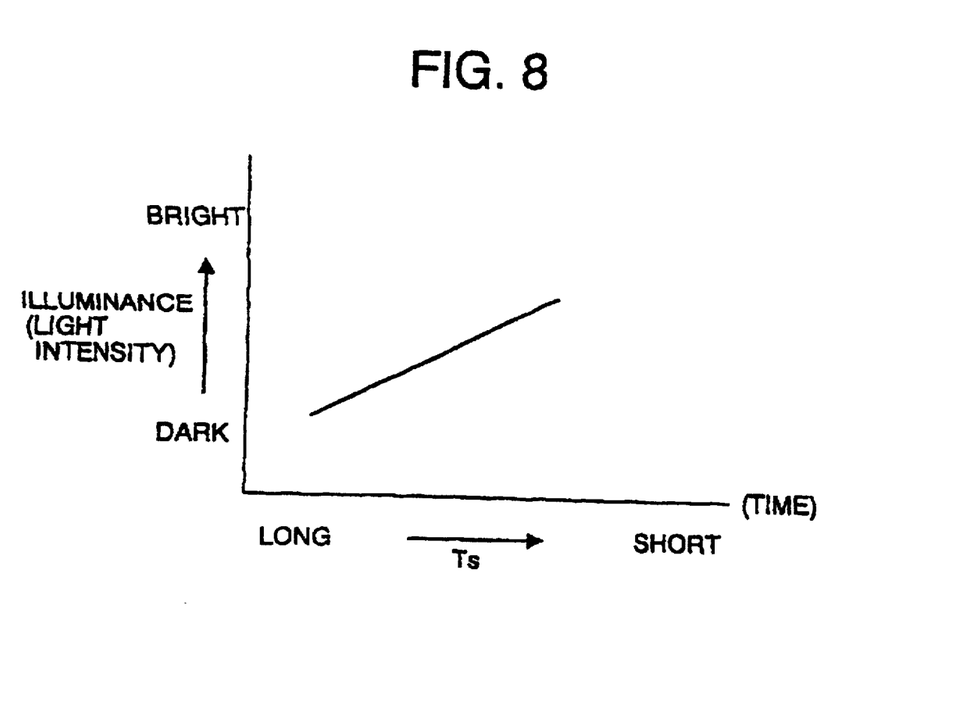
FIG. 8 is a graph showing a relationship between light exposure times and light intensities.

As shown in FIG. 8, the optimum illumination (adequate light intensity) can be calculated from the exposure time Ts. A plurality of appropriate combinations of optimum exposure times Ts and illumination levels is stored in the table memory 15a of the CPU 15. The optimum illumination level is calculated by setting an illumination level corresponding to the optic exposure time Ts.

Data Reading

A data reading (symbol decoding) image capture is performed in order to read the data symbol 38 after the waiting interval W elapses. The data reading image capture uses a full frame video image having all of the picture elements available.

In the data reading image capture, the CPU 15 further activates the CCD driving circuit 6 after the waiting interval W elapses. A horizontal CCD driving pulse and a vertical CCD driving pulse are output from the CCD driving circuit 6 to the CCD 43 to control the accumulation and transfer of charge at the CCD 43.

Clock signals are also generated at the CCD driving circuit 6. For example, composite clock signals, having a horizontal synchronization signal and a vertical synchronization signal combined with a clock signal, are transmitted from the CCD driving circuit 6 to the CPU 15.

The amplification circuit 8 is connected to the CCD 43, and amplifies the (analog) image signals from the CCD 43, and performs A/D conversion to give a digital image signals (for example, 8-bit image signals). The digital image signals are then input into the binarization circuit 10.

In the binarization circuit 10, the digital image signals from each picture element are turned into a binary value of "1" or "0" according to predetermined threshold data. A binarized data value of "1" corresponds to a black part of the data symbol 38 while a value of "0" corresponds to a white part. The binarized data output from the binarization circuit 10 are transferred through the CPU 15 and stored in predetermined addresses in the memory 12 by means of an address counter included in the CPU 15. This address counter is driven according to the composite clock signals input from the CCD driving circuit 6.

In the reading operation, firstly, the binarized data are read sequentially from the memory 12 in accordance with the addresses designated by the address counter (the read order may be reversed with respect to the storage order). The CPU 15 performs any necessary image processing. For example, image inversion; extraction of only binarized data for the data symbol 38 based on the coordinate data of the border picture images; dropout correction; or rotation, and the are then performed on the binarized data for one image. The CPU 15 also decodes the binarized data into usable data in accordance with the decoding system for the particular type of the data symbol 38. The decoded data is then sent via the communication driver 16 to an externally connected host computer 17. The host computer 17 may be, for example, a personal computer or a workstation. The storage, tabulation, and so on of the usable data are then performed on the host computer 17.

Control Operations

Figure 9:
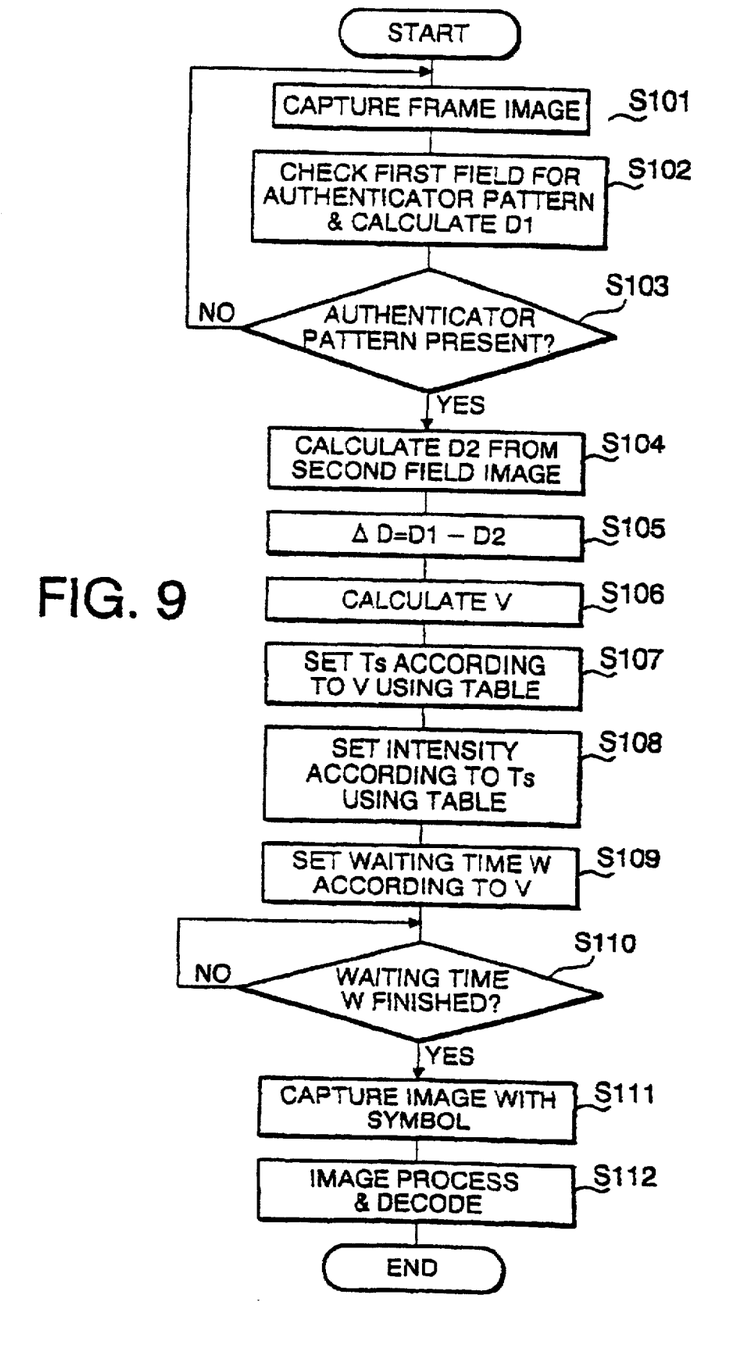
FIG. 9 is a flow chart showing the control of the data symbol reading system shown in FIG. 1.

FIG. 9 is a flow chart showing a control flow of the CPU 15 for controlling the data symbol reader 1 according to the invention.

When the trigger switch 14 is turned ON, the process of FIG. 9 is started. In step S101, a frame image capture is performed, and the image of the first field (odd number field) and second field (even number field) are acquired. The first and second field image data (image signals) are binarized, and the binarized data (binarized signals) are written in the memory 12.

In step S102, the process analyzes the first field image, and checks for a (black) authenticator pattern, for example, for checking along the nth horizontal line for an authenticator pattern of the proper width, as previously described. If an authenticator pattern 91 is detected, the number of CCD picture elements D1 corresponding to the distance from the leading end of the first field image to the leading edge 92 of the authenticator pattern 91 (as shown in FIG. 7) is calculated. The number of picture elements D1 is calculated from the memory 12 on the basis of the reading address of the edge 92.

In step S103, the process checks if an authenticator pattern 91 was found in step S 102. If an authenticator pattern 91 was not found (N in step S103), then the process loops back to step S101 and scans (acquires) a new image.

If, however, an authenticator pattern 91 was found in step S102, then the process proceeds to step S104. In step S104, the number of CCD picture elements D2 corresponding to the distance from the leading end of the second field image to the edge 92 of the authenticator pattern 91 is calculated, similarly to the procedure for the first field.

In step S105, the displacement of the authenticator pattern 91, that is, the difference ΔD between D1 and D2 is calculated.

In step S106, the moving speed V of the moving subject 9 and the data symbol 38 is calculated according to the previously described expression (1).

In step S107, the optimum light exposure time Ts (adequate electric charge accumulation time) is calculated from the moving speed V on the basis of the table data (as described in FIG. 7) in the table memory 15a.

In step S108, the optimum light intensity is calculated from the optimal light exposure time Ts on the basis of the table data (as described in FIG. 8) in the table memory 15a.

In step S109, the waiting time W until a normal image capture can be taken (i.e., for reading the symbol data as opposed to setting the exposure) is calculated from the moving speed V. The waiting time is set in the timer 15b incorporated in the CPU 15, and timer 15b is started.

In step S110, the process loops in place until the waiting time W, as counted by the timer 15b, is finished.

In step S111, a normal image capture (normal light exposure) is carried out, using the previously determined optimal light exposure time Ts and illumination intensity.

Figure 5D:
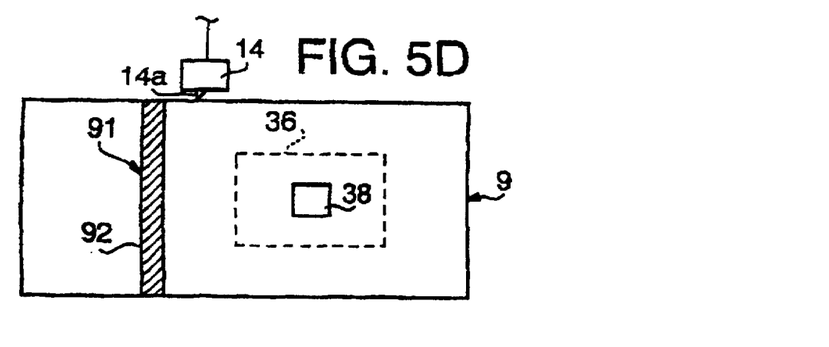

In this case, as shown in FIG. 5D, since the appropriate waiting time W has passed, the data symbol 39 is in the symbol reading area 36 when the normal image capture is performed. The image data (image signals) are binarized, and the binarized data (binarized signals) are written in the memory 12.

In the preferred embodiment, since both the light exposure time and the illumination light intensity are set to achieve an optimum light exposure quantity, the normal image capture is carried out under the best light exposure conditions at all times. However, it is acceptable that only the light exposure time is controlled until a decoding error occurs, in which case the light intensity is then controlled.

In step S112, the previously described image processing and decoding are carried out and the decode data is transmitted to the host computer 17 via the communication driver 16.

Accordingly, in the embodiment of a data symbol reader 1 according to the invention, the optimum light exposure time (also known as shutter speed) is set according to the moving speed of the data symbol 38. Even if the moving speed of data symbol 38 fluctuates, the embodiment of a data symbol reader 1 according to the invention prevents image blur from overly long exposures and lack of definition from overly short exposures. In this manner, the data symbol reader 1 prevents reading errors, and increases the reading accuracy of data symbols 38.

Furthermore, since the light emitting intensity of the light sources 41 is adjusted according to the light exposure time, the data symbol reader prevents overexposure or underexposure from inappropriate illumination.

Still further, since the exposure time and light intensity are automatically set to the optimum values, the operation is more simple than manually set devices.

Although a data symbol reader according to the invention is explained with reference to a preferred embodiment, other constructions are possible without departing from the spirit or scope of the invention.

For example, although the speed detecting device detects the moving speed of the data symbol 38 on the basis of displacement of the authenticator pattern 91 between sequential field images having a known delay therebetween, the speed detecting device may alternatively be constructed so that a predetermined delay is set, or so that non-sequential fields or frames are used.

The present disclosure relates to subject matter contained in Japanese Patent Application No. HEI 07-179533, filed on Jun. 21, 1995, which is expressly incorporated herein by reference in its entirety.

What is claimed is:

1. A data symbol reading system for reading a data symbol on a subject, comprising:

a reading unit including an image sensing device for capturing a video frame image and an optical system for forming images of the subject on the image sensing device, said video frame image having an odd line video field including the subject and an even line video field including the subject with a predetermined time interval therebetween;

a controller for controlling the image sensing device:

a memory for storing said odd line video field including the subject and said even line video field including the subject: and a speed detecting device that detects a moving speed of the data symbol on the subject relative to the reading unit according to a displacement of the subject between said odd line video field including the subject and said even line video field including the subject.

2. The data symbol reading system according to claim 1, wherein said controller controls the image sensing device to capture said video frame image, and said speed detecting device comprising:

a calculation device for calculating a displacement of the subject between said odd line video field including the subject and said even line video field including the subject and for calculating a moving speed of the data symbol on the subject based on said displacement of the subject and said predetermined time interval.

3. The data symbol reading system according to claim 2, wherein the subject is provided with an authenticator pattern associated with the data symbol and that moves together with the data symbol, and wherein the controller controls the image sensing device to capture a video frame image having an odd line video field including the authenticator pattern and an even line video field including the authenticator pattern, and wherein said calculation device calculates a displacement of said authenticator pattern between the odd line video field including the authenticator pattern and the even line video field including the authenticator pattern, and calculates the moving speed of the data symbol, associated with said authenticator pattern, based on said displacement of said authenticator pattern and on said predetermined time interval.

4. The data symbol reading system according to claim 1, said speed detecting device comprising:

calculation means for calculating said displacement of the subject between said odd line video field including the subject and said even line video field including the subject, and for calculating said moving speed of said data symbol on the subject based on said displacement of the subject and said predetermined time interval.

5. The data symbol reading system according to claim 4, wherein the subject is provided with an authenticator pattern associated with said data symbol, said authenticator pattern moving together with the data symbol, and wherein the controller controls the image sensing device to capture a video frame image having an odd line video field including the authenticator pattern and an even line video field including the authenticator pattern, and wherein said calculation device calculates a displacement of said authenticator pattern between said odd line video field including the authenticator pattern and said even line video field including the authenticator pattern, and calculates the moving speed of the data symbol based on said displacement of said authenticator pattern and said predetermined time interval.

6. The data symbol reading system according to claim 1, further comprising:

exposure time setting means for setting an exposure time of said image sensing device for obtaining an image of the data symbol according to said detected moving speed of the data symbol on the subject.

7. The data symbol reading system according to claim 6, further comprising:

a variable intensity light source; and light intensity setting means for setting the light emitting intensity of the light source based on said exposure time.

8. The data symbol reading system according to claim 1, wherein said data symbol is a two-dimensional data symbol.

9. A data symbol reading system for reading a data symbol on a moving subject, the moving subject being movable such that the moving subject and the data symbol move through a symbol reading area, comprising:

an image sensing device for capturing a video frame image, said video frame image having an odd line video field including the moving subject and an even line video field including the moving subject with a predetermined time interval therebetween;

an optical system for forming images of a symbol reading area on the image sensing device, said images of the symbol reading area including the moving subject as the moving subject moves through the symbol reading area; and a speed detecting device for detecting a moving speed of the data symbol relative to the reading unit according to a displacement of the moving subject between said odd line video field including the moving subject and said even line video field including the moving subject.

10. The data symbol reading system according to claim 9, wherein an authenticator pattern associated with said data symbol is provided on the moving subject, and wherein said odd line video field includes the authenticator pattern and said even line video field includes the authenticator pattern.

11. The data symbol reading system according to claim 10, wherein said authenticator pattern is provided on said moving subject ahead of the data symbol in a moving direction of said moving subject.

12. The data symbol reading system according to claim 10, wherein the speed detecting device comprises:

a controller for controlling said image sensing device to capture said video frame image of said symbol reading area so that said odd line video field includes said authenticator pattern and said even line video field includes said authenticator pattern;

a memory for storing said odd line video field including said authenticator pattern, and for storing an even line video field including said authenticator pattern; and a calculation device for calculating a displacement of said authenticator pattern between said odd line video field including said authenticator pattern and said even line video field including said authenticator pattern, and for calculating said moving speed of said data symbol, associated with said authenticator pattern, based on said displacement of said authenticator pattern and said predetermined time interval.

13. The data symbol reading system according to claim 9, further comprising:

synchronization means for synchronizing movement of said moving subject with said image capture by said image sensing device.

14. The data symbol reading system according to claim 13, wherein said synchronization means comprises:

a trigger switch connected to said reading unit, positioned in the path of said moving subject, and actuated by said moving subject; and a timer for counting a predetermined time after the actuation of said trigger switch by said moving subject, said reading device responding to said timer by starting said image capture.

15. A data symbol reading system, comprising:

a reading unit including an image sensing device for capturing images and an optical system for forming images of a moving subject bearing a data symbol on the image sensing device, wherein said image sensing device captures video frame images, each video frame image having an odd line video field including the moving subject and an even line video field including the moving subject with a predetermined time interval therebetween;

a controller for controlling the image sensing device to carry out the video frame image capture;

a memory for storing data corresponding to said odd line video field including the moving subject and said even line video field including the moving subject; and a calculation device for calculating a displacement of the moving subject between said odd line video field including the moving subject and said even line video field including the moving subject, and for calculating the moving speed of said data symbol on the moving subject based on said displacement of the moving subject and said predetermined time interval.

16. A data symbol reading system for reading a data symbol on a moving subject, comprising:

a reading unit including an image sensing device for capturing a video frame image and an optical system for forming images on the image sensing device, said video frame image including an odd line video field including the moving subject and an even line video field including the moving subject with a predetermined time interval therebetween;

a controller for controlling the image sensing device to capture said video frame image of the moving subject, wherein the moving subject is provided with an authenticator pattern that moves together with the data symbol, and each of said odd line video field and said even line video field includes the authenticator pattern;

a memory for storing data corresponding to said odd line video field including the authenticator pattern and said even line video field including the authenticator pattern; and a calculation device for calculating a displacement of said authenticator pattern on the moving subject between said odd line video field including the authenticator pattern and said even line video field including the authenticator pattern, and for calculating the moving speed of the data symbol on the moving subject based on said displacement of said authenticator pattern on the moving subject and said predetermined time interval.

17. The data symbol reading system according to claim 16, wherein the authenticator pattern is provided in front of said data symbol with reference to a moving direction of said data symbol.

* * * * *